No. 647,794. Patented Apr. 17, 1900.
F. W. BENJAMIN.
NUT LOCK.
(Application filed Jan. 25, 1900.)

(No Model.)

Witnesses:

Inventor,
Fred W. Benjamin
By Davis & Davis,
Attorneys.

UNITED STATES PATENT OFFICE.

FRED W. BENJAMIN, OF JEFFERSON, OHIO.

NUT-LOCK.

SPECIFICATION forming part of Letters Patent No. 647,794, dated April 17, 1900.

Application filed January 25, 1900. Serial No. 2,790. (No model.)

*To all whom it may concern:*

Be it known that I, FRED W. BENJAMIN, a citizen of the United States, and a resident of Jefferson, in the county of Ashtabula, State of Ohio, have invented certain new and useful Improvements in Nut-Locks, of which the following is a specification, reference being had therein to the accompanying drawings, in which—

Figure 1:
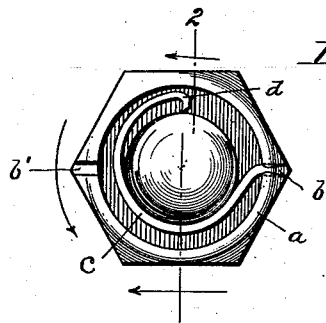
Figure 2:
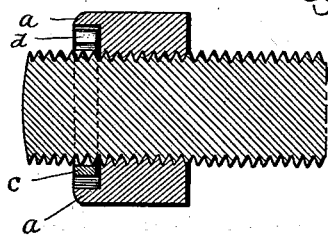

Figure 1 is an end elevation of a bolt provided with my lock-nut; Fig. 2, a vertical section on the line 2 of Fig. 1; and Fig. 3, a similar view to Fig. 1, except that the nut is shown in the act of screwing on.

The object of this invention is to provide a simple and durable nut-lock that will require no alteration whatever of the bolt and only a slight change in the construction of the nut, as more fully hereinafter set forth.

In the drawings the nut is provided in its outer face with an annular recess adjacent to the bolt-hole, a flange $a$ being formed around the edge of the nut by this recess. Fastened in a radial slot $b$ in said flange is the outer end of a lock-spring $c$, which lies in the recess in the nut and partly surrounds the bolt, being provided at its free end with an inward-turned sharpened hook $d$, which normally bears upon the threads of the bolt. The spring $c$ extends around the bolt more than half a turn, but less than a full turn, preferably about three-quarters of a turn, and in the direction the nut is turned in screwing it on the bolt. About one-half the length of the spring lies normally against the bolt-threads.

Figure 3:
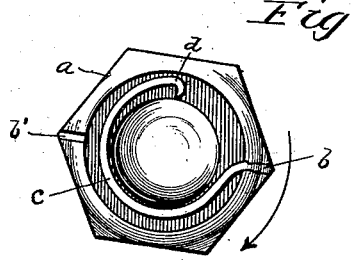

It will be observed that, as shown in Fig. 3, as the nut is screwed on the hook will slide freely over the threads without biting into the same, but with sufficient friction to slightly expand the spring and lift it off the threads of the bolt, thereby allowing the nut to be screwed on without injury to the threads; but when the nut is attempted to be unscrewed the spring binds against the threads of the bolt and draws the hook into the same, the hook being sufficiently sharp to bite into the threads, as shown in Fig. 1. It will be noted that in order that the spring may have the peculiar action set forth the portion that hugs the bolt must be remote from the hook, so that the end portion of the spring shall have a free action between the threads of the bolt and the wall of the recess. The sharpened edge of the hook is directed slightly backward or in the direction of rotation in unscrewing the nut, so that the hook will be sure to bite into the thread.

As shown at $b'$, additional slots may be made in the flange $a$ to permit the spring to be changed or readjusted in case it works loose from the slot it is first secured in. To secure the end of the spring in the slot, it is simply necessary to press or hammer the edges of the slot over upon the end of the spring, the metal of the nut being sufficiently malleable for this.

Having thus fully described my invention, what I claim, and desire to secure by Letters Patent, is—

In combination with a bolt, a lock-nut having attached to its outer face a lock-spring, one end of this spring being attached to the nut and the other end of the spring being free and this free part being extended around the bolt and provided at its extremity with an inward-turned sharp-edged hook normally bearing on the bolt-threads, and the body portion of the spring, at a point remote from the hook, normally lying against the bolt-threads, whereby when the nut is screwed on the bolt the body of the spring will be lifted from the threads and any attempt to unscrew the nut will cause the body of the spring to bind on the bolt-threads and draw the hook into the threads, substantially as set forth.

In testimony whereof I hereunto affix my signature, in the presence of two witnesses, this 24th day of January, 1900.

FRED W. BENJAMIN.

Witnesses:
   A. C. WHITE,
   J. R. BARKER.